(12) United States Patent
Sekita (10) Patent No.: US 6,940,662 B2
(45) Date of Patent: Sep. 6, 2005

(54) LENS SYSTEM AND CAMERA HAVING THE SAME

(75) Inventor: Makoto Sekita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/222,352

(22) Filed: Aug. 16, 2002

(65) Prior Publication Data

US 2003/0112529 A1 Jun. 19, 2003

(30) Foreign Application Priority Data

Aug. 24, 2001 (JP) ........................................ 2001-254804

(51) Int. Cl.$^7$ ............................ G02B 9/60; G02B 13/04
(52) U.S. Cl. ..................................... 359/770; 359/749
(58) Field of Search ............................. 359/770, 776, 359/749–756, 761

(56) References Cited

U.S. PATENT DOCUMENTS

| | | | | |
|---|---|---|---|---|
| 3,731,989 A | * | 5/1973 | Shimizu | 359/753 |
| 6,222,685 B1 | * | 4/2001 | Yamada | 359/770 |
| 6,353,509 B1 | * | 3/2002 | Nakazawa | 359/761 |
| 6,417,975 B1 | * | 7/2002 | Isono | 359/783 |
| 6,600,610 B2 | * | 7/2003 | Ohno | 359/770 |

FOREIGN PATENT DOCUMENTS

| | | |
|---|---|---|
| JP | 46-24194 | 7/1971 |
| JP | 62-78520 | 4/1987 |
| JP | 63-70817 | 3/1988 |
| JP | 63-81414 | 4/1988 |
| JP | 64-61714 | 3/1989 |
| JP | 1-221714 | 9/1989 |
| JP | 3-63613 | 3/1991 |
| JP | 3-288811 | 12/1991 |
| JP | 4-250408 | 9/1992 |
| JP | 5-203871 | 8/1993 |
| JP | 9-166748 | 6/1997 |
| JP | 9-325272 | 12/1997 |
| JP | 10-213742 | 8/1998 |
| JP | 10-293246 | 11/1998 |
| JP | 11-142730 | 5/1999 |
| JP | 2001-100091 | 4/2001 |
| JP | 2001-100094 | 4/2001 |
| JP | 2002-98887 | 4/2002 |
| JP | 2002-228925 | 8/2002 |
| JP | 2002-277734 | 9/2002 |

OTHER PUBLICATIONS translation of JP 11–142730; Minoru et al; published May 28, 1999; 26 pages.*

* cited by examiner

*Primary Examiner*—Georgia Epps
*Assistant Examiner*—Alicia M. Harrington
(74) *Attorney, Agent, or Firm*—Morgan & Finnegan, LLP (57) ABSTRACT

In a lens system, a first lens having negative optical power and a meniscus shape with a convex surface facing an object side, a second lens having positive optical power and a double-convex shape, a third lens having negative optical power and a double-concave shape, a fourth lens having positive optical power, and a fifth lens having positive optical power and a double-convex shape are arranged sequentially from a front side to a rear side. Letting $D_{1,2}$ be an interval between said first and second lenses, $D_{2,3}$ an interval between said second and third lenses, bf be a back focus of the entire system, and f be a focal length of the entire system, at least one of three conditions given by $0.6 < D_{1,2}/f < 1.0$, $0.55 < D_{2,3}/f < 0.85$, and $0.9 < bf/f < 1.1$ is satisfied.

16 Claims, 7 Drawing Sheets

LENS SYSTEM AND CAMERA HAVING THE SAME

BACKGROUND OF THE INVENTION

1. Field of the Invention

The present invention relates to a lens system suitable for a video camera, digital camera, or camera using a film.

2. Related Background Art

In recent years, a variety of video cameras or digital cameras having solid-state image pickup elements have been developed.

Many video cameras or digital cameras are constructed by arranging various kinds of glass members such as low-pass filters and color filters between the rear end (final lens surface) of a photographing lens and an image pickup element.

For this reason, a photographing lens for a video camera or digital camera must have a long back focus as compared to its focal length.

A retrofocus type lens is conventionally known as a lens type with a long back focus. Japanese Patent Publication No. 46-24194 has proposed a retrofocus type lens formed from five lenses which include sequentially from the object side a first lens having negative refracting power and a meniscus shape with its convex surface facing the object side, a second lens having convex lens surfaces on both sides, a third lens having concave lens surfaces on both sides, a fourth lens having positive refracting power, and a fifth lens having convex lens surfaces on both sides. Numerical examples of this prior art have disclosed a lens system having a back focus about 1.3 times the focal length.

Additionally, along with the recent increase in number of pixels in solid-state image pickup elements, optical performance required of a photographing lens is becoming very high. A retrofocus type lens formed from five lenses, including negative, positive, negative, positive, and positive lenses from the object side, is proposed in, e.g., Japanese Laid-Open Patent Application No. 63-81414, 3-63613, 10-213742, 10-293246, or 2001-100091 as a lens system that attains both high imaging performance and a long back focus.

In such a lens system formed from five lenses, including negative, positive, negative, positive, and positive lenses from the object side, when the interval between the first and second lenses is reduced, it becomes difficult to obtain a sufficient back focus. If the back focus is inappropriately increased, the power (the reciprocal of the focal length) of the first lens increases to make it hard to correct aberrations. In addition, the performance degrades sensitively to the parallel and tilt decentering of the first lens. Conversely, when the interval between the first and second lenses is increased, the outer diameter of the first lens increases. This makes the back focus too long and the entire lens bulky. The retrofocus type lens proposed in Japanese Laid-Open Patent Application No. 63-81414 or 10-293246 can advantageously reduce the size of the lens system because the interval between the first and second lenses is relatively small, though aberration correction is difficult.

Furthermore, when the interval between the second and third lenses is reduced, it is difficult to insert an aperture stop between the second and third lenses.

Conversely, when the interval between the second and third lenses is increased, the diameter of the entire lens system increases, and the position through which an off-axis light beam will pass becomes relatively high. As a result, it becomes difficult to correct off-axis aberration.

The retrofocus type lens proposed in Japanese Laid-Open Patent Application No. 10-213742 or 2001-100091 maintains such an interval between the second and third lenses that an aperture stop can be inserted therebetween. However, that interval is not enough to insert a mechanical shutter means.

A photographing lens for a use in a video camera or digital camera must have a back focus long to some extent, as described above. However, a back focus more than necessity is not preferable because it increases the total length of the photographing lens.

In the retrofocus type lens proposed in Japanese Laid-Open Patent Application No. 3-63613, the back focus is as long as 1.2 or more times the focal length. Hence, the total length of the photographing lens tends to be large.

Another retrofocus type lens that is formed from five lenses, i.e., negative, positive, negative, positive, and positive lenses and tries to further improve its performance by using an aspherical surface is proposed in, e.g., Japanese Laid-Open Patent Application No. 9-166748.

In Japanese Laid-Open Patent Application No. 9-166748, aberrations are satisfactorily corrected by causing one surface of the fifth lens which is closest to the image side to have an aspherical surface. The refractive index of the material of the fifth lens is relatively as high as 1.6935.

Generally, as the refractive index of a glass material increases, the cost of the glass material itself becomes high, and the difficulty in forming an aspherical surface also increases.

SUMMARY OF THE INVENTION

The present invention provides a lens system having a new arrangement different from the above-described prior arts. Especially, it is an object of the present invention to provide a compact lens system with high performance while having a sufficiently long back focus.

In order to achieve the above object, a lens system according to the present invention comprises, sequentially from a front side (an object side of a camera) to a rear side (an image side of the camera) a first lens having negative optical power and a meniscus shape with a convex surface facing the object side, a second lens having positive optical power and a double-convex shape, a third lens having negative optical power and a double-concave shape, a fourth lens having positive optical power, and a fifth lens having positive optical power and a double-convex shape.

Particularly, in an embodiment, letting $D_{1,2}$ be an interval between the first and second lenses, $D_{2,3}$ an interval between the second and third lenses, bf be a back focus of the entire system, and f be a focal length of the entire system, at least one of three conditions given by $$0.6 < D_{1,2}/f < 1.0$$

$$0.55 < D_{2,3}/f < 0.85$$

$$0.9 < bf/f < 1.1$$

is satisfied.

In another embodiment, an aperture stop is arranged between the second and third lenses. Letting r9 be a radius of curvature of an image-side lens surface of the fourth lens and r10 and r11 be radii of curvature of object- and image-side lens surfaces of the fifth lens, conditions given by $$-0.75 < r9/r10 < -0.5$$

$$-1.7 < (r10-r11)/(r10+r11) < -0.9$$

are satisfied.

DETAILED DESCRIPTION OF THE PREFERRED EMBODIMENTS

Figure 1:
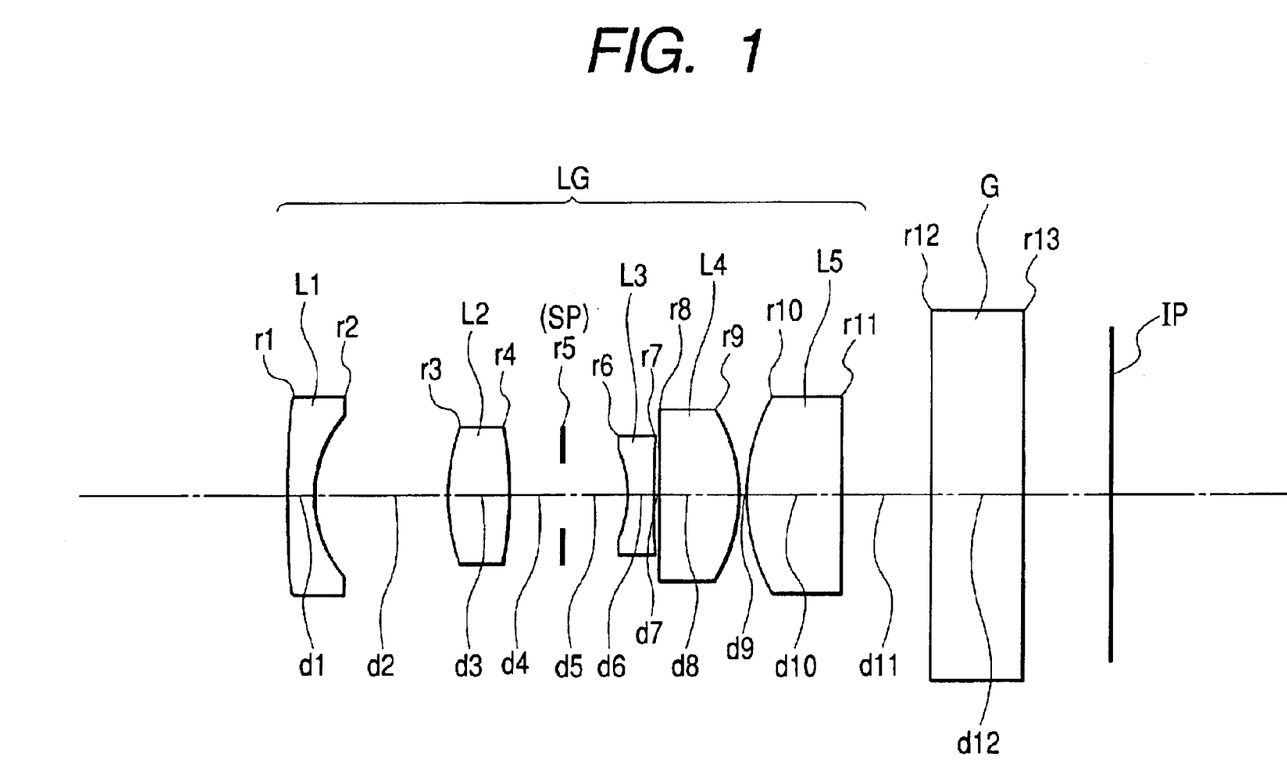
FIG. 1 is a sectional view of the lenses in a lens system of Numerical Example 1.
Figure 3:
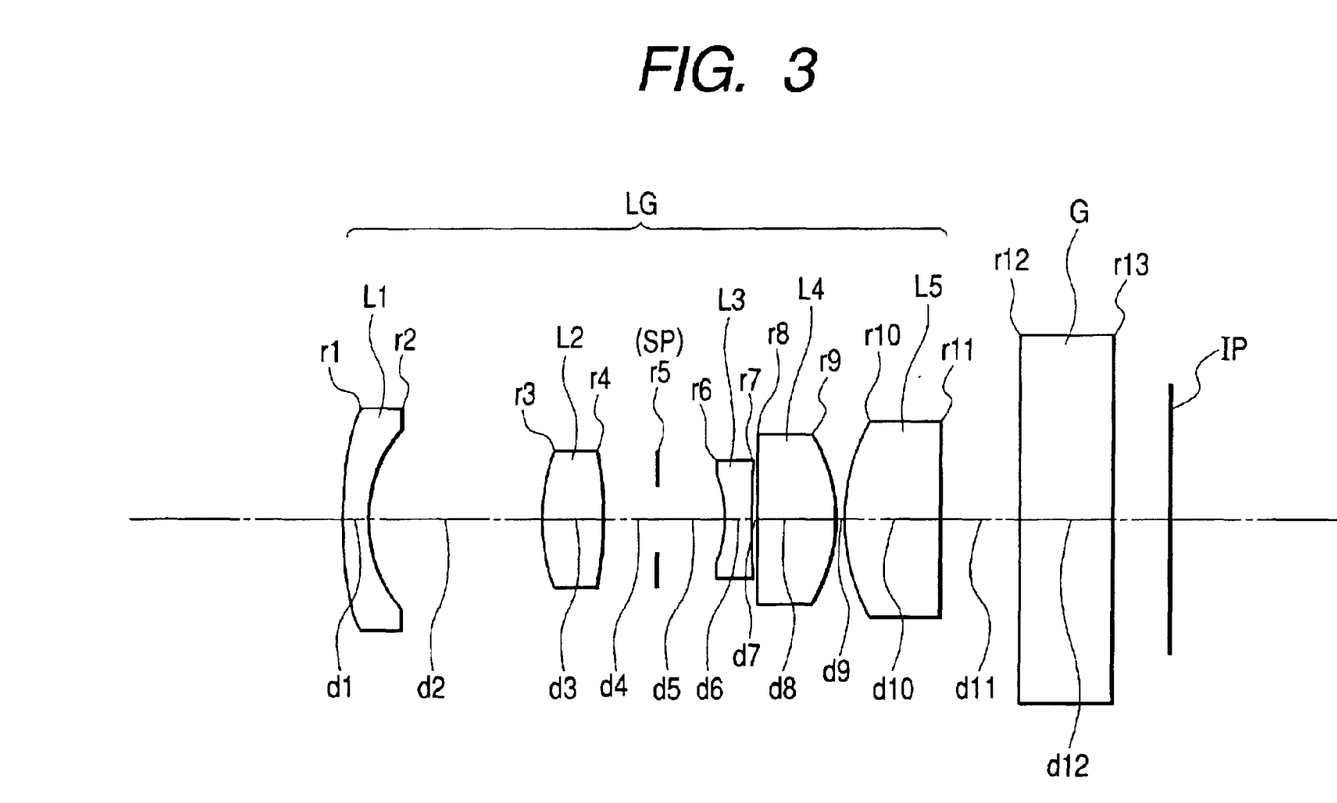
FIG. 3 is a sectional view of the lenses in a lens system of Numerical Example 2.
Figure 5:
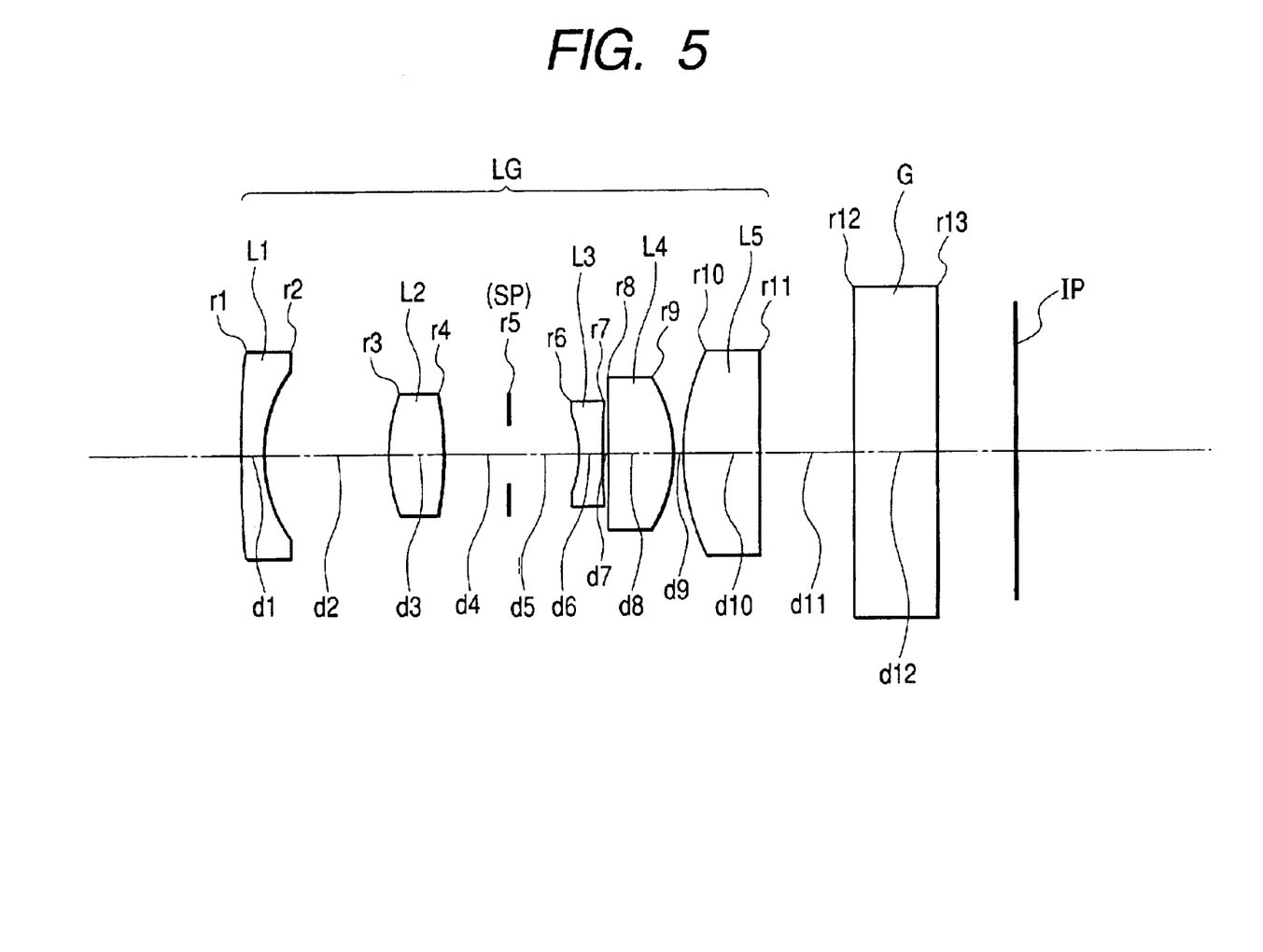
FIG. 5 is a sectional view of the lenses in a lens system of Numerical Example 3.

FIGS. 1, 3, and 5 are sectional view of the lenses in lens systems of Numerical Examples 1 to 3 corresponding to the first to third embodiments of the present invention.

Figure 2:
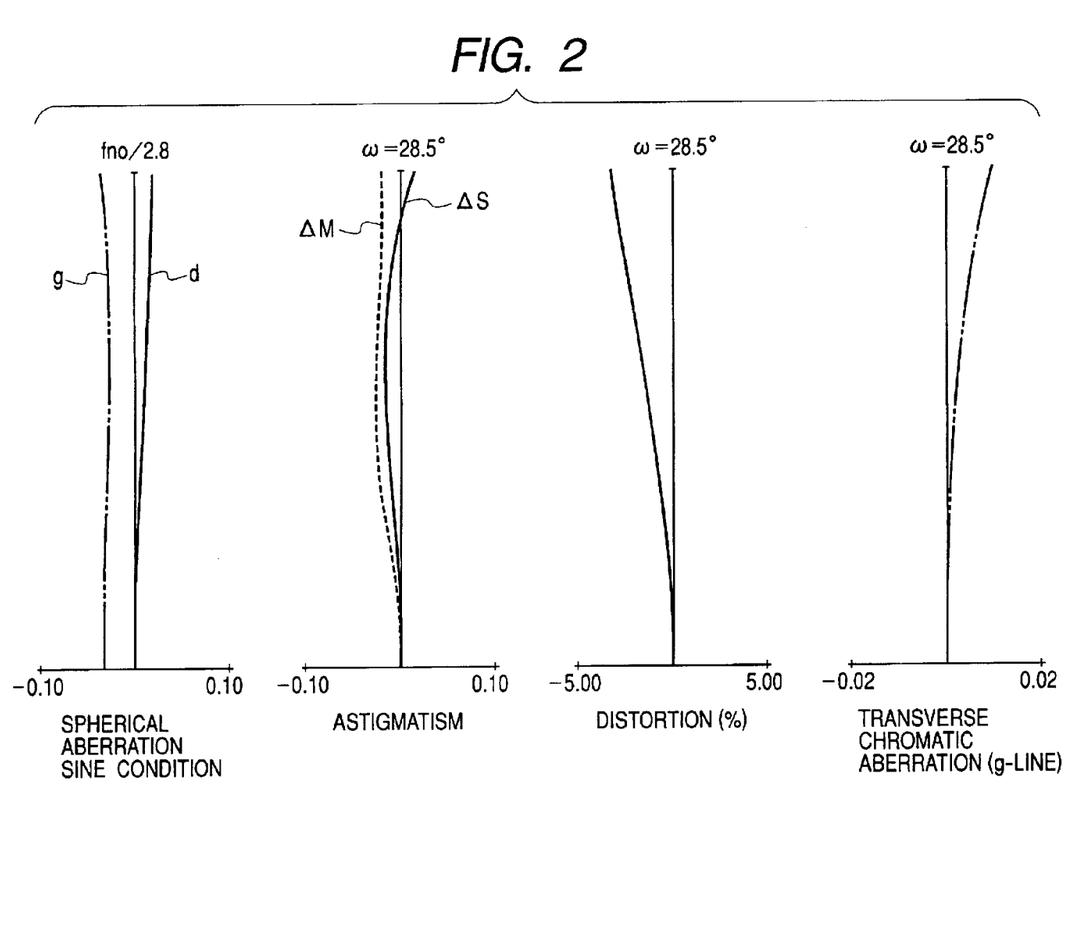
FIG. 2 is a chart showing aberrations in the lens system of Numerical Example 1.
Figure 4:
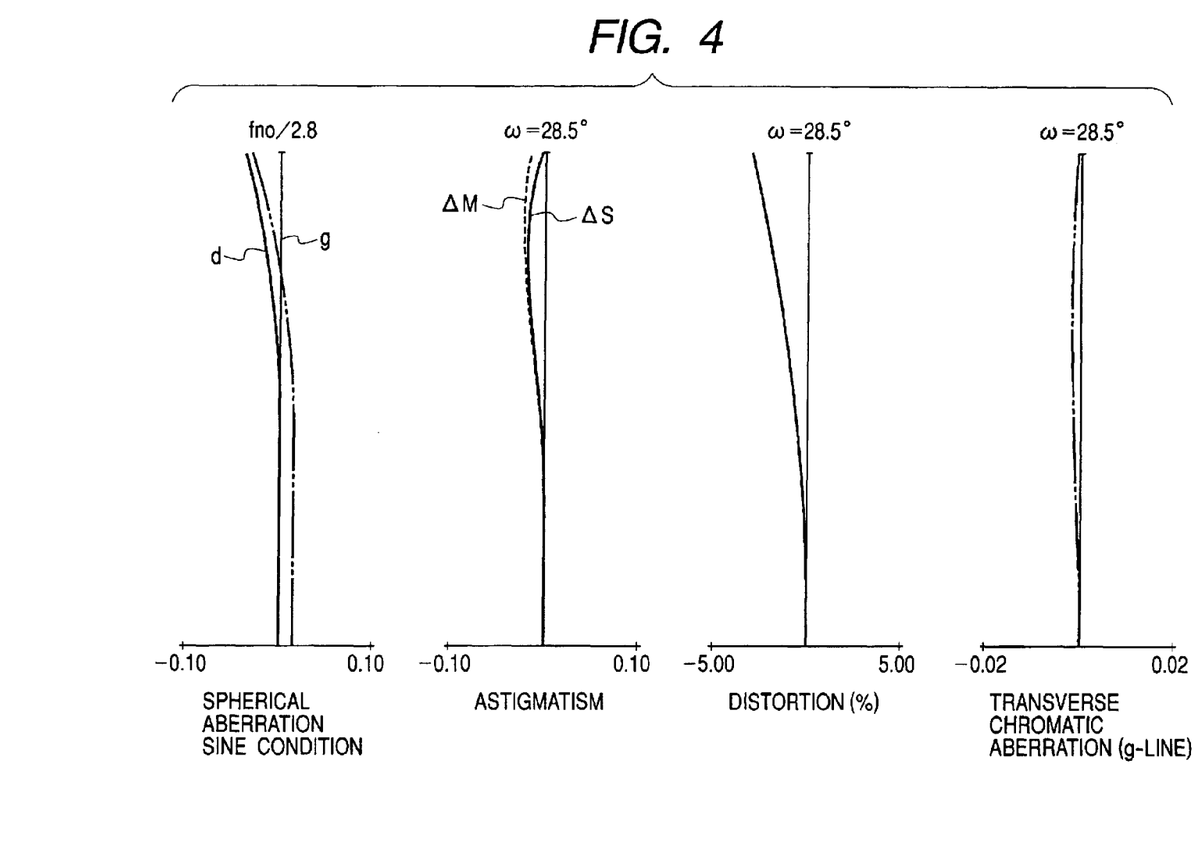
FIG. 4 is a chart showing aberrations in the lens system of Numerical Example 2.
Figure 6:
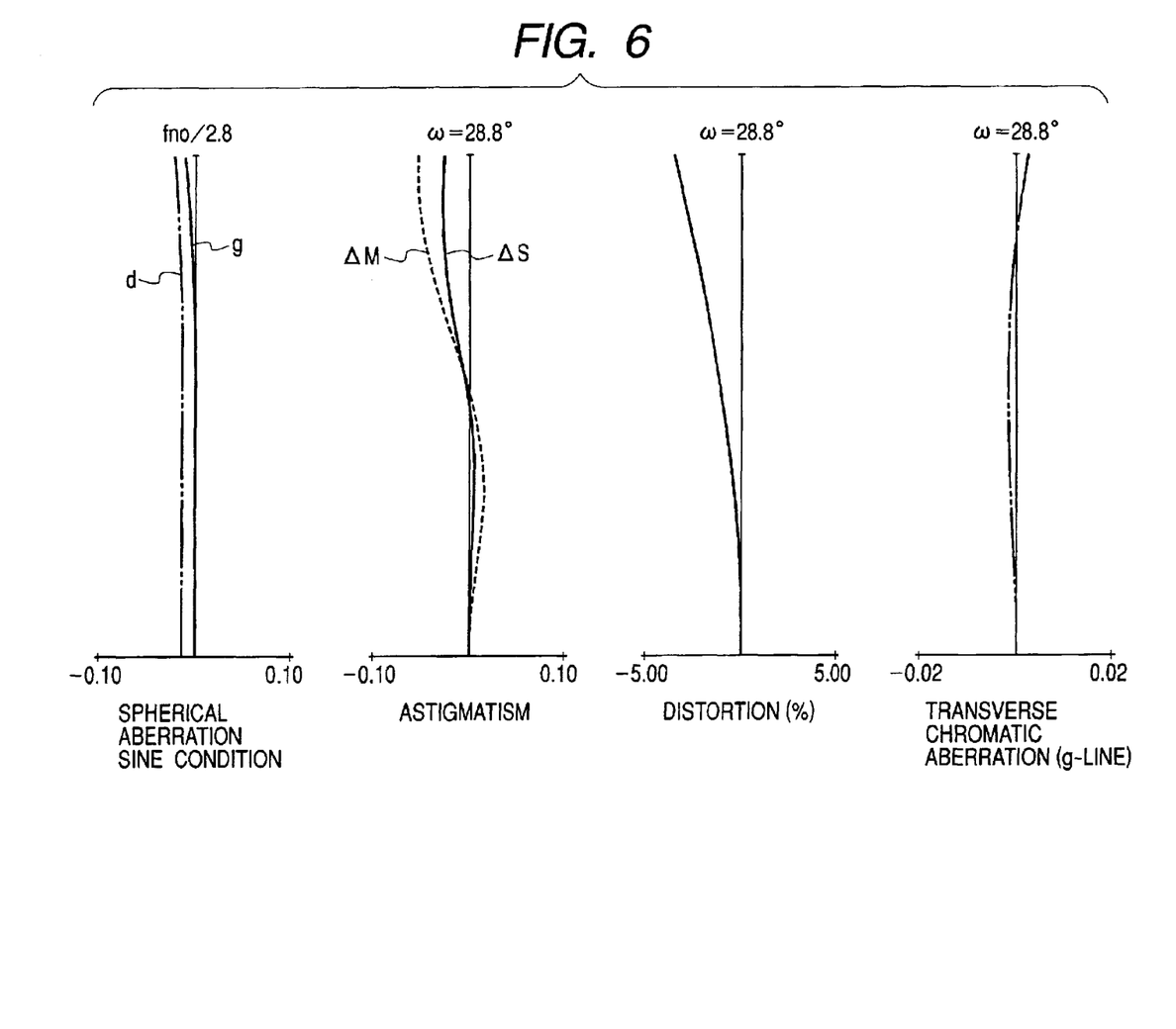
FIG. 6 is a chart showing aberrations in the lens system of Numerical Example 3.

FIGS. 2, 4, and 6 are charts showing aberrations in Numerical Examples 1 to 3 corresponding to the first to third embodiments of the lens system of the present invention.

In the sectional views of the lenses, the left corresponds to the object side (front side), and the right corresponds to the image plane side (rear side).

A lens system LG has a first lens L1 having negative refracting power (optical power) and a meniscus shape with its convex surface facing the object side, a second lens L2 having positive refracting power and convex lens surfaces on both sides, a third lens L3 having negative refracting power and concave lens surfaces on both sides, a fourth lens L4 having positive refracting power and a meniscus shape with its convex surface facing the image plane side or convex lens surfaces on both sides, and a fifth lens L5 having positive refracting power and convex lens surfaces on both sides. A glass block G corresponds to an optical filter or faceplate. A solid-state image pickup element such as a CCD or CMOS is arranged on an image plane TP.

For the descriptive convenience, the "ith lens Li" will be referred to as the "ith lens".

In each numerical example, letting $D_{1,2}$ be the interval between the first and second lenses, $D_{2,3}$ be the interval between the second and third lenses, bf be the back focus, f be the focal length of the entire system, r9 be the radius of curvature of the image-side lens surface of the fourth lens, r10 and r11 be the radii of curvature of the object- and image-side lens surfaces of the fifth lens, and nd5 be the refractive index of the material of the fifth lens, $$0.6 < D_{1,2}/f < 1.0 \quad (1)$$

$$0.55 < D_{2,3}/f < 0.85 \quad (2)$$

$$0.9 < bf/f < 1.1 \quad (3)$$

$$nd5 < 1.65 \quad (4)$$

$$-0.75 < r9/r10 < -0.5 \quad (5)$$

$$-1.7 < (r10-r11)/(r10+r11) < -0.9 \quad (6)$$

are satisfied. The technical meaning of the above-described conditional expressions will be described next.

Conditional expression (1) is related to the ratio of the interval (lens surface interval) between the first and second lenses to the focal length of the entire system. If the interval is smaller than the lower limit value, it is difficult to obtain a sufficient back focus. If the back focus is inappropriately increased, the power of the first lens increases to make it hard to correct aberrations. In addition, the optical performance degrades sensitively to the parallel and tilt decentering of the first lens.

Conversely, when the interval is more than the upper limit value, the effective diameter of the first lens increases. This also undesirably makes the back focus too long and the entire lens bulky.

Conditional expression (2) is related to the ratio of the interval between the second and third lenses to the focal length of the entire system. If the interval is smaller than the lower limit value, it is difficult to insert an aperture stop between the second and third lenses. This makes it impossible to set the exit pupil sufficiently far away.

Conversely, when the interval is more than the upper limit value, the effective diameter of the entire lens system increases, and the position through which an off-axis light beam will pass becomes relatively high. As a result, it becomes difficult to correct off-axis aberration.

Conditional expression (3) is related to the ratio of the back focus to the focal length of the entire system. If the back focus is more than the upper limit value, the total length of the lens system becomes too large, resulting in a bulky system. In addition, the power of the first lens increases to make it difficult to correct distortion. Conversely, when the back focus is less than the lower limit value, it is difficult to insert a low-pass filter or color filter.

Conditional expression (4) is related to the refractive index of the material of the fifth lens. This condition is necessary for satisfactorily correcting, especially, curvature of field while using a glass material which has a low refractive index and is easy and inexpensive to manufacture.

Conditional expression (5) is related to an air lens between the fourth and fifth lenses. When the value is smaller than the lower limit value, spherical aberration and coma cannot be sufficiently corrected. If the value is larger than the upper limit value, curvature of field is undesirably over-corrected.

Conditional expression (6) is related to the lens shape of the fifth lens. Like conditional expression (5), if the value is smaller than the lower limit value, spherical aberration and coma cannot be sufficiently corrected. If the value is larger than the upper limit value, curvature of field and distortion are undesirably over-corrected.

More preferably, the numerical ranges of the above-described conditional expressions are set to $$0.65 < D_{1,2}/f < 0.95 \quad (1a)$$

$$0.6 < D_{2,3}/f < 0.82 \quad (2a)$$

$$0.92 < bf/f < 1.1 \quad (3a)$$

$$nd5 < 1.63 \quad (4a)$$

$$-0.7 < r9/r10 < -0.55 \quad (5a)$$

$$-1.6 < (r10-r11)/(r10+r11) < -0.95 \quad (6a)$$

In each example, the fifth lens has at least one aspherical surface.

Especially, an aspherical surface with a smaller radius of curvature than that of a reference spherical surface is arranged on the image side of the fifth lens.

With this arrangement, satisfactory optical performance is obtained across the frame.

When an aperture stop is inserted between the second and third lens, a lens system which has a long exit pupil distance and is suitable for an optical device such as a digital camera using a solid-state image pickup element is obtained.

An embodiment of a digital camera (optical device) using the lens system of the present invention as a photographing optical system will be described next with reference to FIG. 7.

Figure 7:
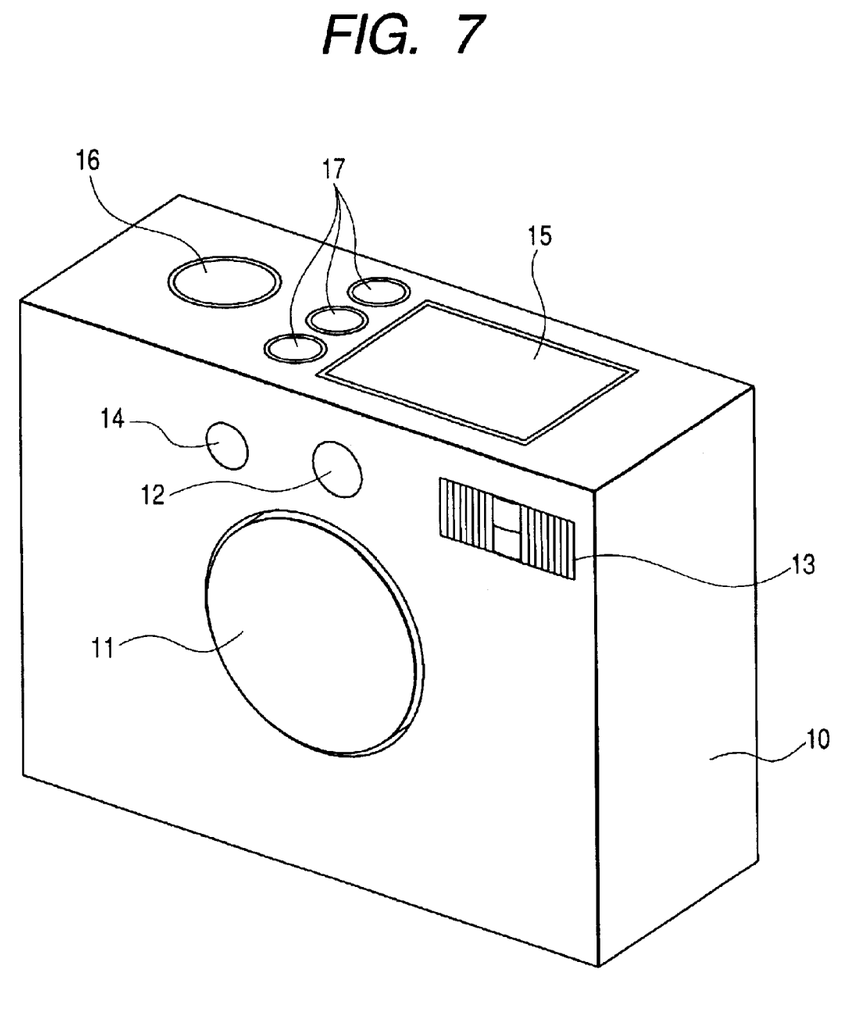
FIG. 7 is a perspective view showing the schematic arrangement of a digital still camera.

Referring to FIG. 7, the digital camera comprises a camera body 10, a photographing optical system 11 formed from the lens system of the present invention, and a viewfinder 12 used to observe an object image. The photographing optical system 11 forms an image on an imaging plane of a solid-state image pickup element (not shown). The solid-state image pickup element converts image information into an electrical signal.

The digital camera also comprises an electronic flash device 13, a measurement window 14, a liquid crystal display window 15 which indicates the operation of the camera, a release button 16, and operation switches 17 used to switch between various kinds of modes.

Numerical Examples 1 to 3 corresponding to the first to third embodiments will be described next. In each numerical example, i is the order from the object side, ri is the radius of curvature of the ith optical surface (ith surface), di is the interval between the ith surface and the (i+1) the surface, and ni and vi are the refractive index and Abbe's number of the material of the ith optical member with respect to the d line. Two planes closest to the image form the glass block G. In addition, f is the focal length, fno is the F-number, and ω is the half view angle. Letting k be the eccentricity, B, C, D and E be the coefficients of aspheric, and x be the displacement in the direction of optical axis at a height h from the optical axis with reference to a plane vertex, an aspherical shape is given by $$x=(h^2/r)/[1+[1-(1+k)(h/R)^2]^{1/2}]+Bh^4+Ch^6+Dh^8+Eh^{10}$$

where r is the radius of curvature. For example, "D-Z" indicates "$10^{-Z}$". Table 1 shows the correspondence with the above-described conditional expressions in each numerical example.

| f = 5.150 | | fno = 1:2.8 | | 2ω = 57° |
|---|---|---|---|---|
| r1 = | 31.112 | d1 = 0.70 | n1 = 1.60311 | v1 = 60.6 |
| r2 = | 3.435 | d2 = 3.60 | | |
| r3 = | 6.261 | d3 = 1.60 | n2 = 1.80400 | v2 = 46.6 |
| r4 = | −10.791 | d4 = 1.38 | | |
| r5 = | (Aperture Stop) | d5 = 1.82 | | |
| r6 = | −2.970 | d6 = 0.70 | n3 = 1.84666 | v3 = 23.9 |
| r7 = | 30.380 | d7 = 0.11 | | |
| r8 = | −866.466 | d8 = 2.10 | n4 = 1.77250 | v4 = 49.6 |
| r9 = | −4.314 | d9 = 0.20 | | |
| r10 = | 6.536 | d10 = 2.50 | n5 = 1.58313 | v5 = 59.4 |
| *r11 = | −34.312 | d11 = 2.37 | | |
| r12 = | ∞ | d12 = 2.50 | n6 = 1.51633 | v6 = 64.1 |
| r13 = | ∞ | | | |

Coefficient of Aspheric
Surface No

| | r | K | B |
|---|---|---|---|
| 11 | −3.43123D+01 | −5.47801D+02 | −3.07806D−04 |
| | C | D | E |
| | 2.79551D−04 | −2.65951D−05 | 1.19330D−06 |

| f = 5.150 | | fno = 1:2.8 | | 2ω = 57° |
|---|---|---|---|---|
| r1 = | 10.056 | d1 = 0.70 | n1 = 1.77250 | v1 = 49.6 |
| r2 = | 3.607 | d2 = 4.63 | | |
| r3 = | 7.226 | d3 = 1.60 | n2 = 1.77250 | v2 = 49.6 |
| r4 = | −10.376 | d4 = 1.47 | | |
| r5 = | (Aperture Stop) | d5 = 1.92 | | |
| r6 = | −3.473 | d6 = 0.70 | n3 = 1.84666 | v3 = 23.9 |
| r7 = | 13.127 | d7 = 0.14 | | |
| r8 = | 49.048 | d8 = 2.10 | n4 = 1.77250 | v4 = 49.6 |
| r9 = | −4.326 | d9 = 0.20 | | |
| r10 = | 6.639 | d10 = 2.50 | n5 = 1.62299 | v5 = 58.1 |
| *r11 = | −705.127 | d11 = 2.24 | | |
| r12 = | ∞ | d12 = 2.50 | n6 = 1.51633 | v6 = 64.1 |
| r13 = | ∞ | | | |

Coefficient of Aspheric
Surface No

| | r | K | B |
|---|---|---|---|
| 11 | −7.05127D+02 | −6.59164D+06 | 6.31006D−04 |
| | C | D | E |
| | 6.54520D−06 | 2.02951D−07 | −1.97660D−08 |

| f = 5.100 | | fno = 1:2.8 | | 2ω = 57° |
|---|---|---|---|---|
| r1 = | 43.064 | d1 = 0.60 | n1 = 1.60311 | v1 = 60.6 |
| r2 = | 4.156 | d2 = 3.90 | | |
| r3 = | 10.475 | d3 = 1.60 | n2 = 1.80400 | v2 = 46.6 |
| r4 = | −10.553 | d4 = 1.87 | | |
| r5 = | (Aperture Stop) | d5 = 2.16 | | |
| r6 = | −3.957 | d6 = 0.70 | n3 = 1.84666 | v3 = 23.9 |
| r7 = | 27.657 | d7 = 0.12 | | |
| r8 = | −736.502 | d8 = 2.00 | n4 = 1.77250 | v4 = 49.6 |
| r9 = | −4.385 | d9 = 0.20 | | |
| r10 = | 7.236 | d10 = 2.40 | n5 = 1.58313 | v5 = 59.4 |
| *r11 = | −37.379 | d11 = 2.89 | | |
| r12 = | ∞ | d12 = 2.50 | n6 = 1.51633 | v6 = 64.1 |
| r13 = | ∞ | | | |

Coefficient of Aspheric
Surface No

| | r | K | B |
|---|---|---|---|
| 11 | −3.73790D+01 | −1.00682D+03 | −8.05530D−04 |
| | C | D | E |
| | 2.41849D−04 | −2.17739D−05 | 9.73580D−07 |

TABLE 1

|  |  | Lower Limit | Upper Limit | Numerical Example 1 | Numerical Example 2 | Numerical Example 3 |
|---|---|---|---|---|---|---|
| Conditional Expression (1) | $D_{1,2}$ |  |  | 3.60 | 4.63 | 3.90 |
|  | f |  |  | 5.150 | 5.150 | 5.100 |
|  | $D_{1,2}/f$ | 0.6 | 1.0 | 0.699 | 0.899 | 0.765 |
| Conditional Expression (2) | $D_{2,3}$ |  |  | 3.20 | 3.39 | 4.03 |
|  | f |  |  | 5.150 | 5.150 | 5.100 |
|  | $D_{2,3}/f$ | 0.55 | 0.85 | 0.621 | 0.658 | 0.790 |
| Conditional Expression (3) | bf |  |  | 5.021 | 4.893 | 5.579 |
|  | f |  |  | 5.150 | 5.150 | 5.100 |
|  | bf/f | 0.9 | 1.1 | 0.975 | 0.950 | 1.094 |
| Conditional Expression (4) | nd5 |  | 1.65 | 1.58313 | 1.62299 | 1.58313 |
| Conditional Expression (5) | r9 |  |  | −4.314 | −4.326 | −4.385 |
|  | r10 |  |  | 6.536 | 6.639 | 7.236 |
|  | r9/r10 | −0.75 | −0.5 | −0.660 | −0.652 | −0.606 |
| Conditional Expression (6) | r10 |  |  | 6.536 | 6.639 | 7.236 |
|  | r11 |  |  | −34.312 | −705.127 | −37.379 |
|  | (r10 − r11)/(r10 + r11) | −1.7 | −0.9 | −1.471 | −1.019 | −1.480 |

What is claimed is:

1. A lens system comprising, sequentially from a front side to a rear side:
   a first lens having negative optical power and a meniscus shape with a convex surface facing an object side;
   a second lens having positive optical power and a double-convex shape;
   a third lens having negative optical power and a double-concave shape;
   a fourth lens having positive optical power; and
   a fifth lens having positive optical power and a double-convex shape,
   wherein lenses of said lens system are only said first, said second, said third, said fourth and said fifth lens; and
   wherein letting $D_{1,2}$ be an interval between said first and second lenses, $D_{2,3}$ an interval between said second and third lenses, bf be a back focus of the entire system, and f be a focal length of the entire system, three conditions given by $0.6 < D_{1,2}/f < 1.0$ $0.55 < D_{2,3}/f < 0.85$ $0.9 < bf/f < 1.1$ are satisfied; and
   wherein the lenses are disposed on an optical axis with intervals therebetween.

2. A system according to claim 1, wherein letting r9 be a radius of curvature of an image-side lens surface of said fourth lens and r10 and r11 be radii of curvature of object- and image-side lens surfaces of said fifth lens, conditions given by $-0.75 < r9/r10 < -0.5$ $-1.7 < (r10-r11)/(r10+r11) < -0.9$ are satisfied.

3. A system according to claim 1, wherein said fifth lens is an aspherical lens.

4. A system according to claim 1, wherein letting nd5 be a refractive index of a material of said fifth lens, a condition given by $nd5 < 1.65$ is satisfied.

5. A system according to claim 1, wherein said lens system forms an image on a solid-state image pickup element.

6. A camera comprising:
   said lens system of claim 1; and
   a solid-state image pickup element which receives an image formed by said lens system.

7. A lens system comprising, sequentially from a front side to a rear side:
   a first lens having negative optical power and a meniscus shape with a convex, surface facing an object side;
   a second lens having positive optical power and a double-convex shape;
   an aperture stop
   a third lens having negative optical power and a double-concave shape;
   a fourth lens immediately following the third lens, the fourth lens having positive optical power; and
   a fifth lens immediately following the fourth lens, the fifth lens having positive optical power and a double-convex shape,
   wherein letting r9 be a radius of curvature of an image-side lens surface of said fourth lens and r10 and r11 be radii of curvature of object- and image-side lens surfaces of said fifth lens, conditions given by $-0.75 < r9/r10 < -0.5$ $-1.7 < (r10-r11)/(r10+r11) < -0.9$ are satisfied.

8. A system according to claim 7, wherein said fifth lens is an aspherical lens.

9. A system according to claim 7, wherein letting nd5 be a refractive index of a material of said fifth lens, a condition given by $nd5 < 1.65$ is satisfied.

10. A system according to claim 7, wherein said lens system forms an image on a solid-state image pickup element.

11. A camera comprising:

said lens system of claim 7; and a solid-state image pickup element which receives an image formed by said lens system.

12. A lens system comprising, sequentially from a front side to a rear side:

a first lens having negative optical power and a meniscus shape with a convex surface facing an object side;

a second lens having positive optical power and a double-convex shape;

an aperture stop;

a third lens having negative optical power and a double-concave shape;

a fourth lens having positive optical power; and a fifth lens having positive optical power and a double-convex shape, wherein lenses of said lens system are only said first, said second, said third, said fourth, and said fifth lens; and wherein letting $D_{1,2}$ be an interval between said first and second lenses, $D_{2,3}$ be an interval between said second and third lenses, bf be back focus of the entire system, f be a focal length of the entire system, r9 be a radius of curvature of the rear side lens surface of said fourth lens and r10 and r11 be radii of curvature of the front and rear side lens surfaces of said fifth lens, five conditions given by $0.65 < D_{1,2}/f < 0.95$ $0.6 < D_{2,3}/f < 0.82$ $0.92 < bf/f < 1.1$ $-0.7 < r9/r10 < -0.55$ $-1.7 < (r10-r11)/(r10+r11) < -0.9$ are satisfied.

13. A system according to claim 12, wherein said fifth lens is an aspherical lens.

14. A system according to claim 12, wherein letting $nd5$ be a refractive index of a material of said fifth lens, a condition given by $nd5 < 1.65$ is satisfied.

15. A system according to claim 12, wherein said lens system forms an image on a solid state image pickup element.

16. A camera comprising:

said lens system of claim 12; and a solid state image pickup element which receives an image formed by said lens system.

* * * * *